March 25, 1952 D. J. DOYLE 2,590,389
TIME RECORDING APPARATUS FOR RACE TRACKS
Filed Aug. 23, 1946 6 Sheets-Sheet 1

INVENTOR:
Douglas J. Doyle
BY

March 25, 1952      D. J. DOYLE      2,590,389
TIME RECORDING APPARATUS FOR RACE TRACKS
Filed Aug. 23, 1946      6 Sheets-Sheet 2

INVENTOR:
Douglas J. Doyle
BY
Kent W. Wonnell
Atty.

March 25, 1952  D. J. DOYLE  2,590,389
TIME RECORDING APPARATUS FOR RACE TRACKS
Filed Aug. 23, 1946  6 Sheets-Sheet 3

INVENTOR:
Douglas J. Doyle
BY
Kent W. Worrell
atty

March 25, 1952 D. J. DOYLE 2,590,389
TIME RECORDING APPARATUS FOR RACE TRACKS
Filed Aug. 23, 1946 6 Sheets-Sheet 5

INVENTOR:
Douglas J. Doyle
BY
Kent W. Wormell
atty.

Patented Mar. 25, 1952

2,590,389

UNITED STATES PATENT OFFICE 2,590,389

TIME RECORDING APPARATUS FOR RACE TRACKS

Douglas J. Doyle, Chicago, Ill.

Application August 23, 1946, Serial No. 692,549

6 Claims. (Cl. 95—86)

This invention relates in general to a photo-electrical timer by which the elapsed time of an event or an occurrence, the starting time, the finishing time, and the elapsed time at any intermediate point may be accurately recorded and shown, and also the positions of the contestants at any point may be shown if desired.

The invention is more particularly described as a time recording apparatus for photographing and accurately timing any object moving on a prescribed course, such for example, as a race-track for horses.

The stop watch system now commonly employed for many races is not sufficiently accurate to time races for record purposes or for stakes or prizes in which there may be a close finish. Cameras are also employed at the finish line to show the positions of the horses or other contestants at this important point, but the present invention proposes to make an accurately timed record not only at the start and finish of a race, but also at any intermediate point such as the quarters, or the half, and also if desired, to show the positions of the contestants throughout the entire race.

An important object of the invention is to provide a camera mounted at a central point within a continuous track and adapted to be turned completely around a vertical axis, equipped with a telephoto lens and a time indicating device, and with an electric eye circuit set up across the tracks at the starting, finishing, and any other intermediate points such that as the horses race around the track, they will interrupt a beam of light in each electric eye circuit which will be observed by the camera, the camera taking pictures of the horses as they race around the track and photographing the electric eye device at each of the separate points, as each one goes on and off, with a photographic time indication also made by the camera, concurrently with pictures of the race.

A further object of the invention is to provide a moving camera which is itself moved around the inner edge of the race course operating in conjunction with a timing device, an air pressure indicator, and with electric eye circuits such that the camera will be moved upon its own track in advance of the horses, showing the positions of the horses at all times and particularly at designated points as the lead horse breaks an electric eye circuit, the camera taking pictures of the flashing lights at any of the predetermined critical points.

Another object of the invention is to provide improved means for mounting and propelling a camera in advance of a contestant or a number of contestants automatically keeping them in view at the curves as well as in the straight portions of the track.

A further object of the invention is to provide improved electrical apparatus in combination with a moving or movable camera and an electric time piece carried with the camera so that the variations thereof may be accurately observed and recorded.

A further object of the invention is to provide means for automatically controlling the opening of the camera lens to obtain a clear picture of the contestants as, for example, if the contestants run for a portion of the race in a shadow of the grandstands, or of trees at one side of the course.

Another object of the invention is to provide a wind pressure indicating device movable with and photographed by the camera, so that pressure variations may be observed and recorded for various conditions about the entire race-track.

A further object of the invention is to provide a new and improved time recording apparatus for accurately photographing the contestants, the time, and the positions of the contestants at any predetermined elapsed time of the race.

Other objects of the invention will appear in the specification and will be apparent from the accompanying drawings illustrating the invention and in which, Fig. 1 is a plan view of a racetrack having a central rotatable camera, a movable camera mounted upon a track at the inside of the race-track and with electric eye devices mounted at predetermined points about the track for observation by the moving cameras;

In this invention, as the starter presses the button for electrically opening the starting gates, he energizes the circuits for moving the glider which carries a camera, and also the electric eye devices at the various points around the track. The camera will be controlled to run about 50 feet ahead of the leading race horse and as the lead horse breaks each electric eye circuit, the camera will take pictures of the light "on" and "off" and also of an electric clock carried with the camera which will indicate exactly the timing of the entire race. After the camera glider mechanism reaches the end of the course, the exposed films are removed from the camera and developed immediately.

Upon showing the films or pictures of a race, the horses will be seen first at the starting gate along with the lighted shadow box, the electric clock and the other indicators. The shadow box light will go out and the time this occurs will be noted by the electric clock. The other lights will go out at the different marks and at the finish and in each case, the exact and elapsed time and the air pressure will be noted. Thus a complete picture of the race will be obtained showing the positions of the contestants along with the exact time for the entire race and for each quarter of the race.

Figure 1:
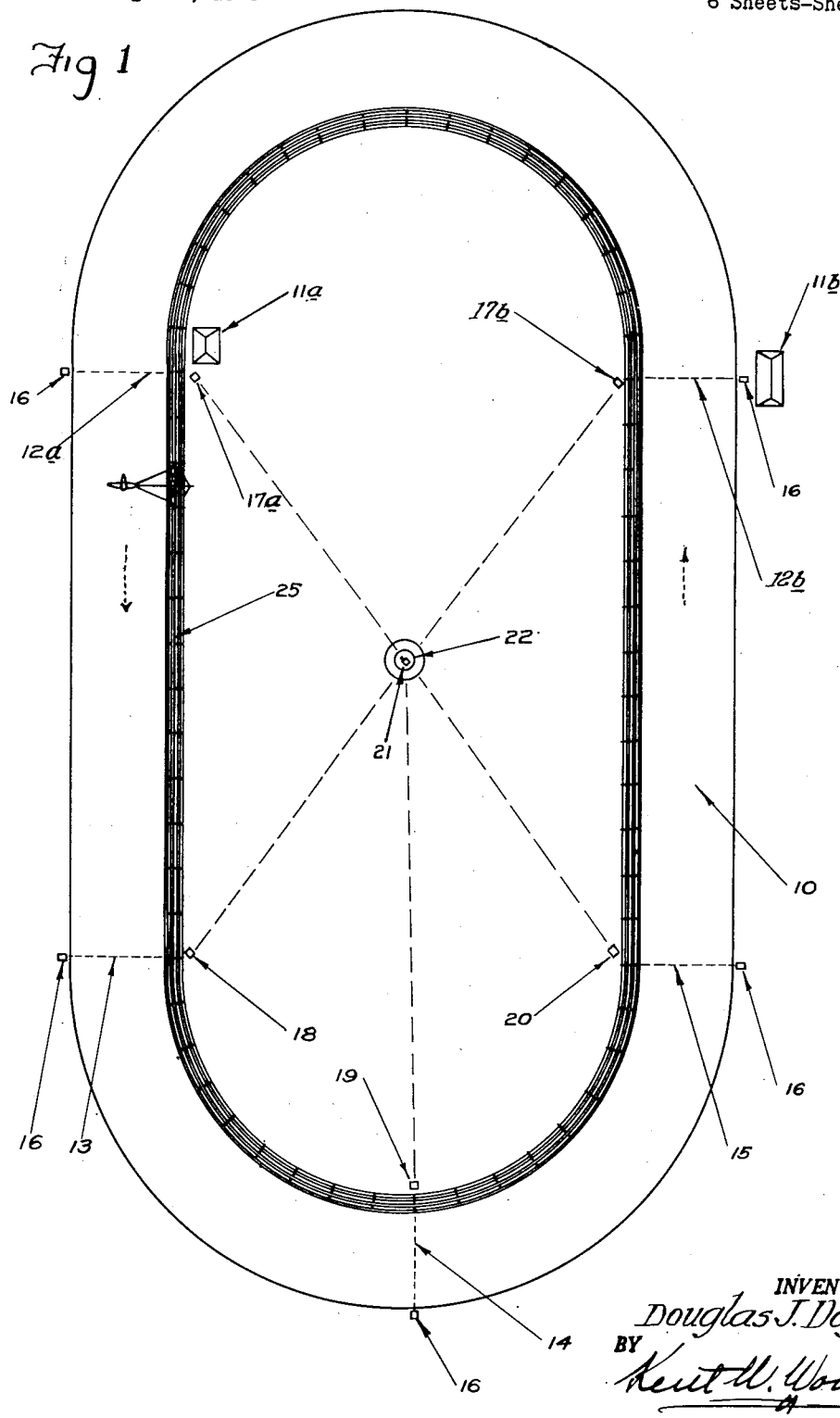
Figure 2:
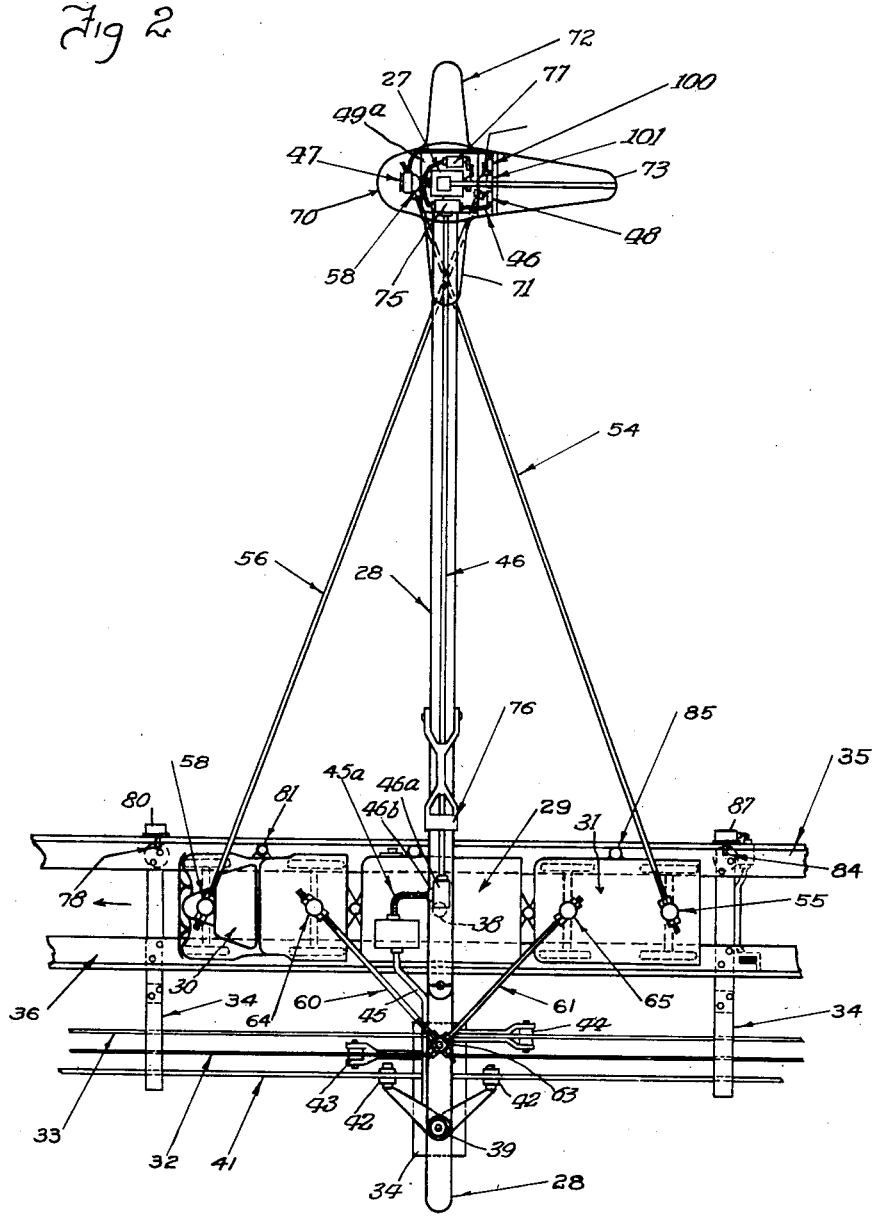
Fig. 2 is a plan view of the movable camera apparatus mounted for movement upon its own particular track.
Figure 3:
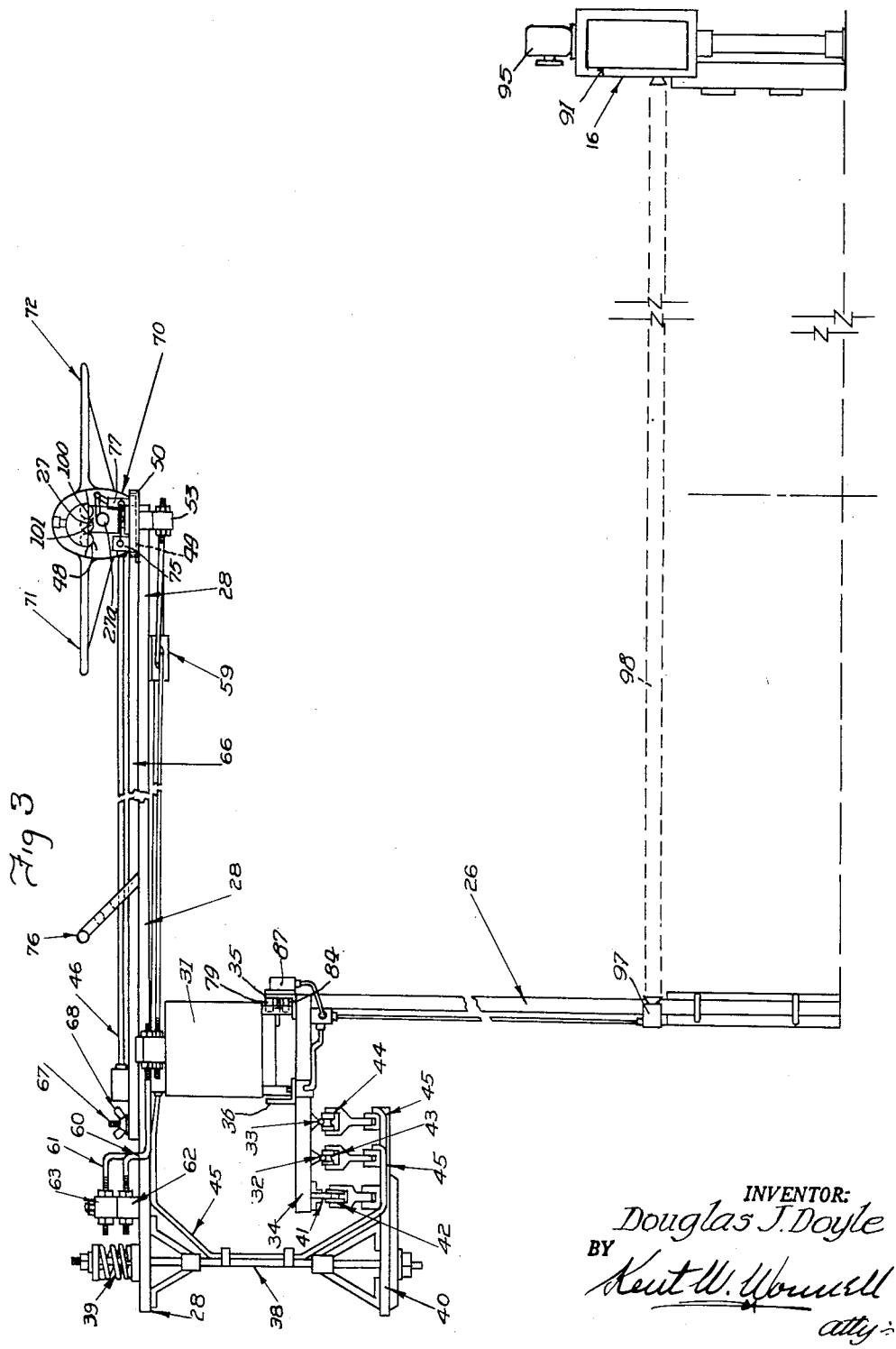
Fig. 3 is a rear elevation of the apparatus shown in Fig. 2.
Figure 4:
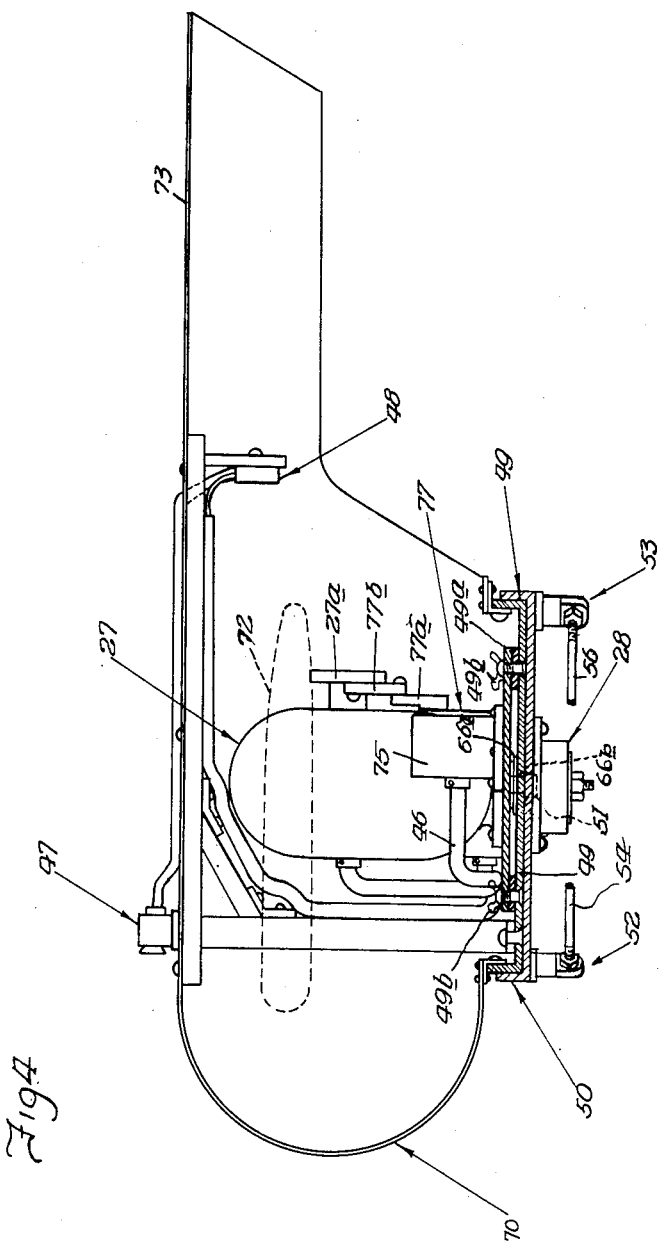
Fig. 4 is an enlarged side and sectional view showing the movable camera and its mounting.

Referring now more particularly to the drawings, a race course or track 10 is shown in Fig. 1 having a judges' starting stand 11a at the starting line 12a, and a finish stand 11b at the finish line 12b. If the track is of a one mile length, for example, the starting line may be the finish line. Well equipped tracks have one-quarter, one-half and three-quarter posts, as well as the start, finish and other lines, where the timing of the horses is usually observed.

At the starting and finish lines 12a and 12b, and at the quarter posts represented by lines 13, 14 and 15, an electric eye device 16 is set up at the outside of the track adapted to control a beam of light directly across the track to reflector or shadow boxes 17a, 17b, 18, 19 and 20 respectively. As the horses race around the track, they will interrupt each beam of light, causing the light in the shadow box to go out. By photographing the time indicator at the same time that each shadow box flashes or goes "on" and "off," an accurate record can be made of the timing of the race, at any quarter and for the full course.

As shown in Fig. 1, a camera 21 of the motion picture type may be located at one side of a straight track or centrally of the open space within a continuous track. It is mounted upon a support 22, preferably elevated, which may be turned in any direction for photographing a full 360°. It is equipped with a telephoto lens and a timing device and is adapted to be directed to the shadow boxes 17a, 17b, 18, 19 and 20 which are set up and placed so that the lighted face of the box will point in the direction of the camera. This camera may also be moved to take pictures of the horses as they race around the track and it will photograph and record the time each shadow box goes "on" and "off."

In projecting a motion picture of the race, the projector may be stopped each time a shadow box is pictured with its light out. The picture of the chronometer will indicate exactly what time, or the elapsed time that the leading horse reached that position on the track.

At the inner side of the race course, an elevated track 25 may be erected upon suitable standards or poles 26, the elevated track extending continuously around the entire inner edge of the race course.

A motion picture camera 27 is mounted to rotate about a vertical axis at the outer end of a lever 28 which in turn is carried adjacent its other end upon a truck 29 movable upon the track 25 and forming part of a train comprising also trucks 30 and 31 pivotally connected thereto, one or all of which are driven by a variable speed electrical motor or motors.

Power for driving this train is obtained from a pair of conductors 32 and 33 at the under side of arms 34 each supported by one of the track standards 26 and upon which inner and outer angular rails 35 and 36 are carried, these rails constituting the elevated track upon which the truck train is movable.

The lever 28 has a mounting 37 supporting it on the central truck 29 at a distance from the inner end of the lever which overlaps the support. A rod 38 extends through and depends from the lever at its inner end with a spring mounting 39 attached to the rod above the lever 28 and with a platform 40 suitably supported and carried at the lower end of the lever below the track supporting arms 34. A contact rail 41 extends continuously around the track at the under side of the rail supporting arms 34 and this is engaged by contact rollers 42 carried by the platform 40, thereby supporting the opposite end of the lever 28 and the camera in balanced position extending above the race course.

This platform 40 also carries trolley wheels 43 and 44 in contact with conductors 32 and 33 for supplying current by means of suitable electrical conductors mounted in conduits 45 extending from the trolley wheels upwardly to the lever 28 and thence to the motor train and outwardly with respect to the lever through conduits 46 to control the camera operation.

To control the turning movement of the camera 27 at the curves of the race course, it is mounted to rotate or swing accordingly at the end of the lever 28. For this purpose, a flanged square or angular carrier pan 50 is pivotally mounted to turn upon a pivot or bearing 51 at the inner end of the lever 28, and swivel bearings 52 and 53 are fastened at the under front and rear ends of the carrier pan. A guide rod 54 extends from the forward bearing 52 to a swivel bearing 55 on the rear of the last truck 31 of the train and another guide rod 56 is connected from the rear swivel bearing 53 to a swivel bearing 58 mounted at the front of the front truck 30 of the train. Since the rods 54 and 56 cross each other intermediate their ends, a slotted carrier block 59 is mounted at the under side of the lever 28 for guiding and holding the rods in place.

To strengthen and support the lever 28 against turning with respect to its mounting on the truck 29, a pair of rods 60 and 61 are connected to swivel mountings 62 and 63 respectively near the inner end of the lever, the first rod extending to a swivel mounting 64 on the front truck 30 and the other rod extending to a swivel mounting 65 on the rear truck 31. The locations of these swivel mountings 64 and 65 are such that when the train of three trucks turns upon a curve, no motion will be imparted to the lever 28 but it will be steadied and reinforced in its position. The rods 54 and 56 extending to the outer end of the lever 28 cross each other intermediate their ends and thereby cause a reverse or opposite turning of the camera support pan at the inner end of the lever.

To mount the camera and glider for rotation, removal, and withdrawal from the inner end of the lever arm 28, a retriever arm 66 rests upon the lever and is fastened thereto by a threaded bolt 67 and a thumb screw 68 at the track end of the retriever arm. At the inner projecting end of the retriever arm is a supporting plate 49 which is rotatable upon a pivot 66b at a reduced end 66a of arm 66 and is set upon or into the carrier pan 50 through which the bearing 51 extends, and is rotatable with it. A removable plate 49a is spaced above the plate 49 at the reduced end 66a of the retriever arm which extends between the plates 49 and 49a and is made quickly removable from plate 49 by thumb screws 49b so that the camera 27 and some of the operating parts may be bodily removed therewith if desired.

Mounted upon the plate 49 is a glider structure 70 having opposite wings 71 and 72 and a tail piece 73. These plates 49 and 49a and the glider thus carry the camera 27, a time recorder device 74, an air pressure receiving device 47 and its indicating dial 48, an electrically operated drive motor 75 (Fig. 6) for the camera and various other necessary devices and connections, all of which are rotated with the plate 49 and carrier pan 50 by the rods 54 and 56 as the truck train moves upon a curved portion of the track, so that the horses or other contestants are kept in the field of vision of the camera.

To assist in removing the retriever arm 66, an upwardly projecting handle 76 is mounted near the track end of the retriever arm so that by grasping the handle after the thumbscrew 68 is loosened, the outer or camera end of the arm may be raised and lowered and disengaged from the carrier pan 50. For disengagement of the electrical connections, a flexible cable 45a has a terminal plug 45b removably insertable into the terminal box 46a on top of the retriever arm 66.

A magnetic lens controlling device 77 is provided for the camera, having a crank 77a and a link 77b connecting it to the lens adjustment 27a. Electrical conductors for this device, the camera motor, and the time recording device 74 extend from the glider and through the conduit 46 to the track end of the lever 28.

The glider is mounted on the inner end of the lever arm 28 so that it will reduce the downward pressure on the lever when it is in motion about the race course. It also provides means for supporting a time piece 100, a sweep hand chronometer 101, and the pressure indicating dial 48 at a distance from the camera so that in taking pictures of the horses sufficiently far in front of them, the camera will also take pictures of these instruments, thereby making a continuous record of them available for any desired position around the race course.

Also acting in conjunction with the glider camera mechanism is an electric eye and shadow box 16 construction as previously set forth but having means for illuminating shadow boxes 16 only at proper times as the truck train is moved around the elevated track. This comprises a switch contact 79 extending inwardly from a switch box 80 on one of the tracks 35, adapted to be engaged by a corresponding contact device 81 mounted on the front truck 30 which closes a track time limit switch 82 (Fig. 6) as it will energize an electric eye circuit across the track which in turn lights up the corresponding shadow box. As the lead horse breaks the electric eye circuit, the shadow box light will go out, the camera on the glider will take pictures of the light flashing and also of the timing and wind pressure dials.

During a portion of a race, the horses may be forced to run in the shadow of the grandstands, trees, or other buildings. This will necessitate a larger opening of the camera lens in order to obtain a clear picture of the horses running in the shadow. As the operator notices that the horses are about to approach a shadow, he presses any one of a number of push buttons 86 (Fig. 6) which will energize a circuit in a corresponding magnetic device 87 to project its contact finger 84 at the side of the rail 35. This finger will then trip a limit switch 85 located at the under side of the center truck 29 energizing a circuit from the terminal box on the truck to the magnetic lens controller in the glider through conductors 78a and 78c. The lens controller 77 then opens the lens and after the horses run out of the shadow, the limit switch 85 on the truck may engage another projected contact 84 which opens the limit switch, de-energizes the lens controlling device 77 and the camera lens returns to its normal position.

Figure 6:
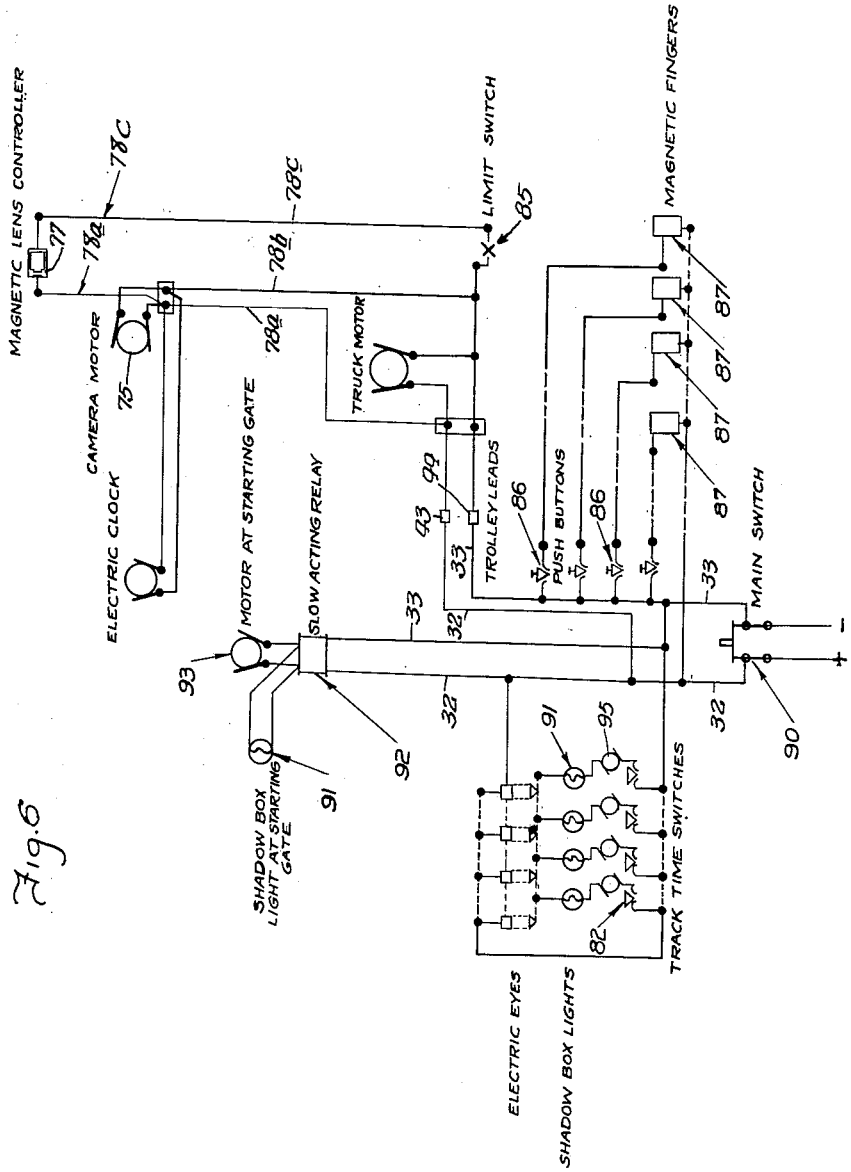
Fig. 6 is a diagrammatic view of the electrical circuits and operating parts controlled thereby.

When the race starter presses an electric button or closes a switch 90 to open the starting gates, the trolley cables 32 and 33 represented as conductors in Fig. 6, are energized, which will set the glider and truck mechanism in motion by energizing the track motor, the camera motor 75 and the electric clock receive current and lights are turned on in a shadow box 91 at the starting gate. At the same time, a slow acting relay 92 energizes a motor 93 to open up the starting gate. This gives sufficient time for the glider to advance about 50 feet ahead of the starting gates before they are opened.

As the starting gates are opened, the shadow box lights 91 will go out as the electric eye circuits across the track are interrupted, and the horses will proceed to advance on the track. The truck train is controlled to run about 50 feet ahead of the lead horse by means of a rheostat control (not shown) in the control tower. As the truck train approaches the first quarter post of the race course, the electric eye circuit for that post will be turned "on" automatically, and the same procedure will take place for each of the other posts and at the finish line. As the lead horse and the other horses break, the electric eye circuits at any of the posts, the camera takes pictures of the flashing shadow box lights and also of the chronometer, electric clock, and wind pressure gauge, which are photographed during the entire race.

When the truck and glider mechanism reaches the end of its course, the glider may be retrieved by means of the retriever arm, the exposed films removed from the camera and immediately developed and printed.

Each electric eye device 16 is represented as having shadow box lights 91 lighted or controlled by electric eye devices (Fig. 6) each having a path extending across the track. By having a number of such electric eye devices for each shadow box, graduated so that each one is operated in succession by the horses passing that post, the timing of each horse at that post can be accurately recorded. At the same time the electric eye circuit for any post is turned on, a timing camera 95, of the electrically driven motion picture type may also be automatically operated. It is preferably located on top of the electric eye device 16, and directed across the track to picture the horses as they pass this post.

When the device 16 receives no more current, the operation of this timing camera 95 will also cease.

Upon showing films of the race, the horses will be seen at the starting gate, the starting shadow box lighted and the time indicated by the electric clock. The shadow box becomes progressively dark as the horses interrupt the electric eye paths across the track and the exact time this occurs is noted in the pictures of the electrical clock which tells the exact time the race started. In the same way, the lights will go out at the other posts and the finish mark, and in each case, the exact time is recorded by the picture of the clock. Thus a complete picture of the race is obtained with the exact timing for the entire race and for each quarter of the race, together with a record of the air pressure or true resistance encountered throughout the race course at the actual speed of the race.

Figure 5:
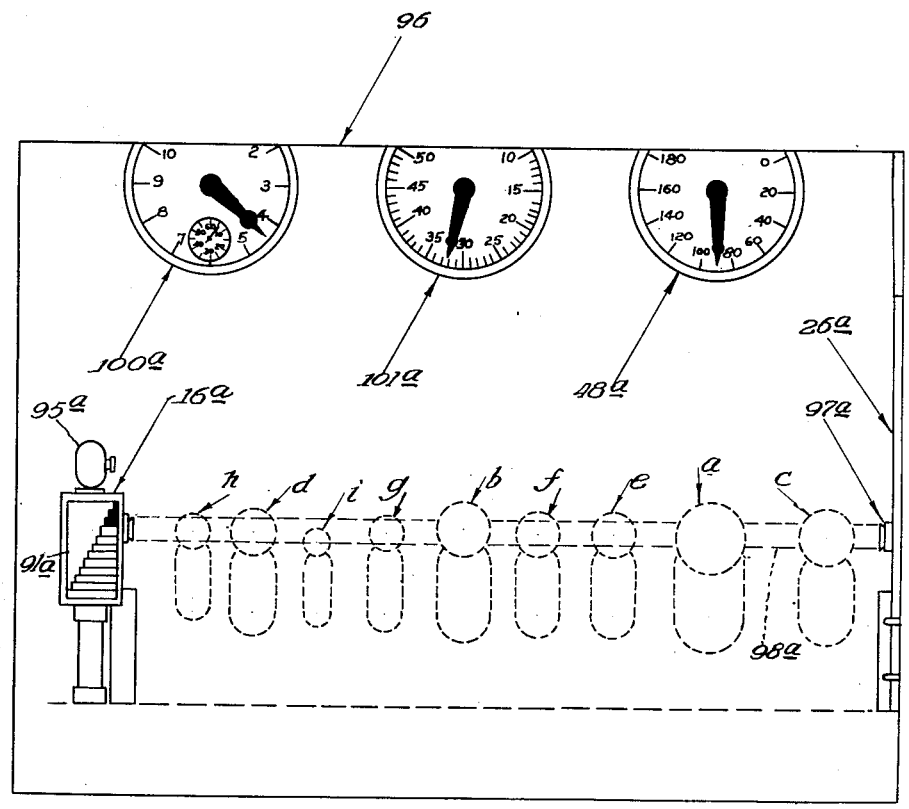
Fig. 5 is a somewhat diagrammatic representation of the type of individual films, or pictures which may be obtained from the moving camera.

An individual film or picture 96 taken by the camera 27 just after the glider passes an electric eye is presented in Fig. 5, in which the clock 100a, the electric sweep hand chronometer 101a, and the air pressure dial 49a are shown at the top, recording these values at the exact time the picture was taken. A light projector 97 at one side of the track transmits a light path 98 across the track to energize the electric eye devices in the opposite shadow box 91, represented by 97a, 98a, and 91a in the photograph.

The light path 98a is represented as broken by the outline figures a, b, and c, representing contestants, and to be in advance of the remaining contestants, d, e, f, g, h, and i, arranged approximately in the order of their sizes, which is also an indication of their proximity to the camera and their position in the race. Within the shadow box 91, the three top tiers are dark, indicating that the first three graduated electric eye devices have had their light paths interrupted by the first three contestants a, b, and c. The remaining tiers remain light which indicates that the succeeding contestants had not yet reached this line at the exact time of taking the picture. For further authentication of the positions of the horses (or contestants) at this post, the record of the timing camera 95 may be checked.

Thus a true picture is obtained of the positions, timing, elapsed time, and wind pressure or resistance, for each separate and individual picture taken by the glider supported camera, which may be supplemented at the various posts by the separate timing cameras 95.

The wiring diagram needs no additional separate and detailed tracing of the circuits: the main switch 90 and the push buttons 86 are commonly located at a central or control station; the starting gate has a motor 93, a slow acting relay 92, and a shadow box light 91 (or lights) receiving current when the main switch is closed; the truck motor, camera motor 75, electric clock, and magnetic lens controller 77, receive current from the trolley wires 32 and 33, the magnetic lens controller being dependent upon the actuation of limit switch 85 by the magnetic projecting devices 87; and the shadow box lights 91, electric eyes and track time switches 82 being automatically energized by the truck train and track switches 80 as it passes around the track.

While the invention has been thus described in detail, it should be regarded by way of illustration rather than of limitation, since various changes in the construction, combination and arrangement of the parts may be made without departing from the spirit and scope of the invention.

I claim:

1. In a time recording apparatus for race tracks, an elevated train track along one side of the race track, a carrier movable upon the elevated track, a supporting beam in the form of a lever mounted upon the carrier and projecting over the race track at one side and beyond the elevated track at the other side, a camera and means for rotatably supporting it at the race track end of the lever in front of contestants on the track, a contact rail extending from the lower side of the elevated track and contact means extending from above the adjacent end of the lever to a position below and engaging the contact rail to hold the said lever and the camera in position extending over the race track.

2. In a time recording apparatus for race tracks, means forming a carrier track along one side of the race track, a carrier comprising a train of pivotally connected trucks, means for driving this train upon the track, a carrier beam in the form of a lever supported by an intermediate truck with one end projecting over the race track, a camera rotatably mounted at the projecting end of the lever, and means for connecting the camera with one of the train trucks other than the one upon which it is mounted to rotate the camera at the curves of the race track keep the contestants within the field of vision of the camera in accordance with the curvature of the track.

3. In a time recording apparatus for race tracks, a carrier track along one side of the race track, an electrically operated carrier truck movable along the carrier track, a beam in the form of a lever mounted transversely upon the carrier truck with one end projecting over the race track, an electrically operated camera mounted at the end of the lever overlying the race track, contact rails at the under side of the carrier track for electrical and supporting engagement, means extending from the adjacent end of said lever for separately engaging the electrical and contact rails, the electrical contacts providing connections for operating the carrier truck and the camera, and the other contact rail providing a balancing engagement for supporting the camera and the lever in position overlying the track.

4. In a time recording apparatus for race tracks, a train track along one side of the race track, a train comprising a plurality of pivotally connected trucks movable upon the train track, a beam in the form of a lever carried by one of the intermediate train trucks and pivoted intermediate the ends of the lever so that one end of the lever projects over the race track and the other end of the lever projects beyond the opposite side of the train track, a camera rotatably mounted at the race track end of the lever, strengthening rods extending from trucks adjacent the lever mounting truck to the end of the lever which projects beyond the train track and cross levers extending from front and rear trucks other than the lever supporting truck and crossed adjacent the camera to move it oppositely with respect to the lever to keep the contestants in the field of vision of the camera at the curve of the train track and the race track.

5. In a time recording apparatus for race tracks, a train track extending along one side of the race track, a truck train movable upon the train track, a supporting beam in the form of a lever mounted upon one of the train trucks projecting at one end over the race track and projecting oppositely beyond the train track, a camera rotatably mounted upon the race track end of the lever in front of contestants on the track, electrical and supporting contact rail connections from the lower side of the other end of the lever engaging below the train track and resilient means in connection with the lever and the said contacting means for holding them tightly in electrical and contacting engagement with their respective contact rails.

6. In a time recording apparatus for race tracks, a carrier mounted for movement along one side of the track, a beam in the form of a lever supported by the carrier and having one end projecting over the race track, a camera and means connected to the carrier for rotatably mounting it for guiding movement at the projecting end of the lever to direct the camera toward contestants and also toward the side of the track, said means comprising a retriever arm mounted at its outer end upon the lever for extending the camera from the truck and drawing it thereto, a releasable fastening connection at the inner end of the retriever arm adjacent the carrier truck, and a handle projecting upwardly from the retriever arm adjacent the carrier truck so that the retriever arm may be secured and released, manually raised and lowered by means of the handle, and the retriever arm with the camera thereon adapted to be engaged and withdrawn from the projecting end of the lever.

DOUGLAS J. DOYLE.

REFERENCES CITED

The following references are of record in the file of this patent:

UNITED STATES PATENTS

| Number | Name | Date |
| --- | --- | --- |
| Re. 22,881 | Del Riccio | May 20, 1947 |
| 212,865 | Muybridge | Mar. 4, 1894 |
| 516,278 | Petri | Mar. 13, 1894 |
| 621,314 | Parber | Mar. 21, 1899 |
| 1,723,926 | Fairchild | Aug. 6, 1929 |
| 1,849,939 | Lipshitz | Mar. 15, 1932 |
| 2,250,442 | Abell | July 29, 1941 |
| 2,255,266 | Moorefield | Sept. 9, 1941 |
| 2,302,331 | Kuprion | Nov. 17, 1942 |
| 2,306,885 | Klemm | Dec. 29, 1942 |
| 2,348,841 | Oswald | May 16, 1944 |
| 2,353,633 | Caldwell el al. | July 18, 1944 |
| 2,396,280 | Miller | Mar. 12, 1946 |
| 2,403,911 | Crowley | July 16, 1946 |
| 2,521,667 | Neyhart | Sept. 5, 1950 |